(12) United States Patent
Beach et al.

(10) Patent No.: US 10,232,233 B2
(45) Date of Patent: *Mar. 19, 2019

(54) GOLF CLUB HEAD

(71) Applicant: Taylor Made Golf Company, Inc., Carlsbad, CA (US)

(72) Inventors: Todd P. Beach, Encinitas, CA (US); Erik Zedelmayer, Encinitas, CA (US)

(73) Assignee: Taylor Made Golf Company, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/877,576

(22) Filed: Jan. 23, 2018

(65) Prior Publication Data

US 2018/0214749 A1 Aug. 2, 2018

Related U.S. Application Data

(63) Continuation of application No. 15/404,512, filed on Jan. 12, 2017, now Pat. No. 9,908,015, which is a (Continued)

(51) Int. Cl.
*A63B 53/04* (2015.01)
*B29L 31/52* (2006.01)
(Continued)

(52) U.S. Cl.
CPC .......... *A63B 53/0466* (2013.01); *B29C 70/46* (2013.01); *B29C 70/86* (2013.01);
(Continued)

(58) Field of Classification Search
CPC ........ A63B 53/0466; A63B 2053/0408; A63B 2053/0412; A63B 2053/042;
(Continued)

(56) References Cited

U.S. PATENT DOCUMENTS 2,171,383 A  8/1939 Wettlaufer
2,654,608 A  10/1953 Liebers
(Continued)

FOREIGN PATENT DOCUMENTS

JP  01-171583  7/1989
JP  04-292178  10/1992
(Continued)

OTHER PUBLICATIONS

Reexam 95/000,040, Mar. 11, 2008, Beach et al.
(Continued)

*Primary Examiner* — Sebastiano Passaniti
(74) *Attorney, Agent, or Firm* — Klarquist Sparkman, LLP

(57) ABSTRACT

A golf club head includes a metal body, a metal strike plate connected to the metal body, and a composite shell that is adhesively bonded to a crown portion of the body via corresponding abutment surfaces. A method for forming a golf club head comprises placing an uncured composite material between a core and a mold that comprises a first piece and a second piece. The second piece is moved towards the first piece such that the uncured composite material is compressed between the core and at least a portion of the mold. The uncured composite material is heated. A first portion of the golf club head is removed from the mold. A second portion of the golf club head is provided. The first portion is attached to the second portion. In certain arrangement, the second portion is formed from a metallic material.

20 Claims, 13 Drawing Sheets

Related U.S. Application Data continuation of application No. 14/048,829, filed on Oct. 8, 2013, now Pat. No. 9,579,549, which is a continuation of application No. 12/730,125, filed on Mar. 23, 2010, now Pat. No. 8,579,726, which is a continuation of application No. 12/253,005, filed on Oct. 16, 2008, now Pat. No. 7,704,164, which is a continuation of application No. 11/401,472, filed on Apr. 10, 2006, now abandoned, which is a continuation of application No. 10/941,474, filed on Sep. 15, 2004, now Pat. No. 7,041,005, which is a continuation of application No. 10/621,641, filed on Jul. 17, 2003, now Pat. No. 6,872,152, which is a continuation of application No. 09/878,634, filed on Jun. 11, 2001, now Pat. No. 6,623,378.

(51) Int. Cl.
*B29C 70/46* (2006.01)
*B29C 70/86* (2006.01)

(52) U.S. Cl.
CPC ... *A63B 2053/042* (2013.01); *A63B 2053/045* (2013.01); *A63B 2053/0408* (2013.01); *A63B 2053/0412* (2013.01); *A63B 2053/0416* (2013.01); *A63B 2053/0433* (2013.01); *A63B 2053/0437* (2013.01); *A63B 2209/02* (2013.01); *A63B 2209/023* (2013.01); *B29L 2031/5227* (2013.01); *Y10T 29/4998* (2015.01); *Y10T 156/10* (2015.01)

(58) Field of Classification Search
CPC .... A63B 2053/0433; A63B 2053/0416; A63B 2209/023; A63B 2209/02; A63B 2053/045; A63B 2053/0437
USPC ................... 473/324–350, 287–292
See application file for complete search history.

(56) References Cited

U.S. PATENT DOCUMENTS

| | | |
|---|---|---|
| 4,021,047 A | 5/1977 | Mader |
| 4,214,754 A | 7/1980 | Zebelean |
| 4,438,931 A | 3/1984 | Motomiya |
| 4,555,115 A | 11/1985 | You |
| 4,681,321 A | 7/1987 | Chen et al. |
| 4,930,781 A | 6/1990 | Allen |
| 5,056,705 A | 10/1991 | Wakita et al. |
| 5,094,383 A | 3/1992 | Anderson et al. |
| 5,176,383 A | 1/1993 | Duclos |
| 5,261,664 A | 11/1993 | Anderson |
| 5,316,298 A | 5/1994 | Hutin et al. |
| 5,328,176 A | 7/1994 | Lo |
| 5,346,217 A | 9/1994 | Tsuchiya et al. |
| 5,377,986 A | 1/1995 | Viollaz et al. |
| 5,407,202 A | 4/1995 | Igarashi |
| 5,410,798 A | 5/1995 | Lo |
| 5,425,538 A | 6/1995 | Vincent et al. |
| 5,482,279 A | 1/1996 | Antonious |
| 5,518,242 A | 5/1996 | Mahaffey et al. |
| 5,533,729 A | 7/1996 | Leu |
| 5,547,427 A | 8/1996 | Rigal et al. |
| 5,624,331 A | 4/1997 | Lo et al. |
| 5,665,014 A | 9/1997 | Sanford et al. |
| 5,669,829 A | 9/1997 | Lin |
| 5,709,615 A | 1/1998 | Liang |
| 5,735,754 A | 4/1998 | Antonious |
| 5,755,627 A | 5/1998 | Yamazaki et al. |
| 5,776,011 A | 7/1998 | Su et al. |
| 5,778,966 A | 7/1998 | Hsieh |
| 5,800,285 A * | 9/1998 | Thorne ............ A63B 53/04 473/324 |
| 5,851,159 A * | 12/1998 | Burrows ........... A63B 53/04 473/345 |
| 5,868,635 A | 2/1999 | Aizawa et al. |
| 5,873,791 A | 2/1999 | Allen |
| 5,888,148 A | 3/1999 | Allen |
| 5,967,904 A | 10/1999 | Nagai et al. |
| 6,162,130 A | 12/2000 | Masumoto et al. |
| 6,162,133 A | 12/2000 | Peterson |
| 6,248,025 B1 | 6/2001 | Murphy et al. |
| 6,280,349 B1 | 8/2001 | Cook |
| 6,299,547 B1 | 10/2001 | Kosmatka |
| 6,334,817 B1 | 1/2002 | Ezawa et al. |
| 6,354,962 B1 | 3/2002 | Galloway et al. |
| 6,406,381 B2 | 6/2002 | Murphy |
| 6,435,980 B1 | 8/2002 | Reyes et al. |
| 6,471,604 B2 | 10/2002 | Hocknell et al. |
| 6,491,592 B2 | 12/2002 | Cackett et al. |
| 6,558,271 B1 | 5/2003 | Beach et al. |
| 6,565,452 B2 | 5/2003 | Helmstetter et al. |
| 6,575,845 B2 | 6/2003 | Galloway et al. |
| 6,607,623 B2 | 8/2003 | Murphy et al. |
| 6,623,378 B2 | 9/2003 | Beach et al. |
| 6,663,504 B2 | 12/2003 | Hocknell et al. |
| 6,670,006 B1 | 12/2003 | Sugimori |
| 6,872,152 B2 | 3/2005 | Beach et al. |
| 6,875,126 B2 | 4/2005 | Yabu |
| 6,902,811 B2 | 6/2005 | Oosedo |
| 6,945,877 B2 | 9/2005 | Kobayashi et al. |
| 6,955,612 B2 | 10/2005 | Lu |
| 6,969,326 B2 | 11/2005 | De Shiell et al. |
| 6,982,053 B2 | 1/2006 | Chen |
| 7,041,005 B2 | 5/2006 | Beach et al. |
| 7,214,142 B2 | 5/2007 | Meyer et al. |
| 7,261,646 B2 | 8/2007 | De Shiell et al. |
| 7,281,991 B2 | 10/2007 | Gilbert et al. |
| 7,281,994 B2 | 10/2007 | De Shiell et al. |
| 7,494,425 B2 | 2/2009 | De Shiell et al. |
| 7,704,164 B2 | 4/2010 | Beach et al. |
| 7,854,364 B2 | 12/2010 | De Shiell et al. |
| 8,096,896 B2 | 1/2012 | De Shiell et al. |
| 8,287,402 B2 | 10/2012 | DeShiell et al. |
| 8,353,785 B2 | 1/2013 | Ines et al. |
| 8,568,248 B2 | 10/2013 | DeShiell et al. |
| 8,579,726 B2 | 11/2013 | Beach |
| 8,932,150 B2 | 1/2015 | Ines et al. |
| 9,452,325 B2 | 9/2016 | Deshiell et al. |
| 9,579,549 B2 * | 2/2017 | Beach ............. A63B 53/0466 |
| 9,839,821 B2 | 12/2017 | De Shiell et al. |
| 9,908,015 B2 * | 3/2018 | Beach ............. A63B 53/0466 |
| 2001/0049310 A1 | 12/2001 | Cheng et al. |
| 2002/0022535 A1 | 2/2002 | Takeda |
| 2002/0065146 A1 | 5/2002 | Kusumoto |
| 2003/0032500 A1 | 2/2003 | Nakahara et al. |
| 2003/0083151 A1 | 5/2003 | Nakahara et al. |
| 2003/0125127 A1 | 7/2003 | Nakahara et al. |
| 2003/0134693 A1 | 7/2003 | Nakahara et al. |
| 2004/0192468 A1 | 9/2004 | Onoda et al. |
| 2005/0119068 A1 | 6/2005 | Onoda et al. |
| 2008/0015048 A1 | 1/2008 | Gilbert et al. |
| 2008/0125246 A1 | 5/2008 | Matsunaga |
| 2013/0337939 A1 | 12/2013 | DeShiell et al. |
| 2014/0038749 A1 | 2/2014 | Beach et al. |
| 2017/0001082 A1 | 1/2017 | DeShiell et al. |

FOREIGN PATENT DOCUMENTS

| | | |
|---|---|---|
| JP | 05-317465 | 12/1993 |
| JP | 7-155410 | 6/1995 |
| JP | 2001259091 | 9/2001 |
| JP | 2002-165902 | 6/2002 |
| JP | 2003-020347 | 7/2003 |
| JP | 2003-020348 | 7/2003 |
| JP | 2004-195214 | 7/2004 |

(56) References Cited

FOREIGN PATENT DOCUMENTS

JP          2004209091       7/2004
WO          WO99/22824       5/1999

OTHER PUBLICATIONS

Reexam 95/000,085, May 27, 2008, Beach et al.
Reexam Request No. 95/000,040 (U.S. Pat. No. 6,623,378), Certificate issued Mar. 11, 2008, Beach et al.
Reexam Request No. 95/000,085 (U.S. Pat. No. 6,872,152), Certificate issued May 27, 2008, Beach et al.
Amendment (dated Apr. 3, 2003), U.S. Appl. No. 09/878,634, filed Jun. 11, 2001 (cited in U.S. Appl. No. 95/000,040), 10pp.
Bonenberger, Paul R., "The First Snap-Fit Handbook: Creating Attachments for Plastic Parts," p. 28. Cincinnati: Hanser Gardner Publication, Inc., 2000.
Chung, Deborah D.L. (1994), Carbon Fiber Composites (pp. 5), Elsevier. Online version available at http://knovel.com/web/portal/browse/display?_EXT_KNOVEL_DISPLAY_bookid=517&VerticalID=0.
Dictionary.com/adhesive, "Get the Top 10 Most Popular Sites for 'Adhesive,'" downloaded from http://dictionary.reference.com/search?q=adhesive, 3pp. (document not dated, downloaded on Mar. 17, 2004).
Ellis, Jeffrey B., "The Golf Club: 400 Years of the Good, the Beautiful & the Creative," excerpt regarding Niagra Clubs. Oak Harbor, WA: Zephyr Productions, Inc., 2003.
Final Office action from the U.S. Patent and Trademark Office in U.S. Appl. No. 14/048,829, dated Feb. 5, 2016.
Information Disclosure Statement (Jul. 7, 2005), U.S. Appl. No. 95/000,085, filed Mar. 29, 2005, 2pp.
Inter Partes Reexamination Communication, Notice of Intent to Issue Inter Partes Reexamination Certificate (Feb. 13, 2008), U.S. Appl. No. 95/000,085, filed Mar. 29, 2005, 5pp.
Inter Partes Reexamination Communication, Notice re Defective Paper in Inter Partes Reexamination (Nov. 24, 2004), U.S. Appl. No. 95/000,040, filed Apr. 21, 2004, 4pp.
Invalidity Analysis of U.S. Pat. No. 6,623,378 to Beach et al., cited in U.S. Appl. No. 95/000,040, date unknown, 4pp.
Mass, Weight, Density or Specific Gravity of Different Metals, http://www.simetric.co.uk/si_metals.htm, author and date unknown.
Notice of Allowability (dated Apr. 16, 2003), U.S. Appl. No. 09/878,634, filed Jun. 11, 2001 (cited in U.S. Appl. No. 95/000,040), 3pp.
Notice of Allowance (dated Jul. 24, 2013), U.S. Appl. No. 12/730,125, filed Mar. 23, 2010, 8pp.
Notice of Allowance from the U.S. Patent and Trademark Office in U.S. Appl. No. 14/048,829, dated Nov. 18, 2016.
Office action (Non-final) (dated Mar. 30, 2004), U.S. Appl. No. 10/316,453, filed Dec. 11, 2002, 14pp.
Office action (Final) (dated Dec. 9, 2004), U.S. Appl. No. 10/316,453, filed Dec. 11, 2002, 11pp.
Office action (Non-final) (dated Apr. 7, 2005), U.S. Appl. No. 10/941,474, filed Sep. 15, 2004, 10pp.
Office action (Non-final) (dated Dec. 3, 2002), U.S. Appl. No. 09/878,634, filed Jun. 11, 2001, 6pp.
Office action (Non-final) (dated Jun. 22, 2009), U.S. Appl. No. 12/253,005, filed Oct. 16, 2008, 12pp.
Office action (Non-final) (dated Aug. 13, 2007), U.S. Appl. No. 11/401,472, filed Apr. 10, 2006, 5pp.
Office action (Final) (dated Mar. 19, 2008), U.S. Appl. No. 11/401,472, filed Apr. 10, 2006, 7pp.
Office action (Non-final) (dated Mar. 19, 2009), U.S. Appl. No. 11/775,197, filed Jul. 9, 2007, 18pp.
Office action (Final) (dated Sep. 24, 2009), U.S. Appl. No. 11/775,197, filed Jul. 9, 2007, 18pp.
Office action (Non-final) (dated Feb. 19, 2010), U.S. Appl. No. 11/775,197, filed Jul. 9, 2007, 18pp.
Office action (Non-final) (dated Dec. 7, 2010), U.S. Appl. No. 12/730,125, filed Mar. 23, 2010, 10pp.
Office action (Non-final) (dated Feb. 28, 2011), U.S. Appl. No. 12/975,116, filed Dec. 21, 2010, 21pp.
Office action from the U.S. Patent and Trademark Office in U.S. Appl. No. 14/048,829, dated Jul. 17, 2015.
Office action (Non-final) (dated Apr. 17, 2013), U.S. Appl. No. 12/730,125, filed Mar. 23, 2010, 12pp.
Office action from the U.S. Patent and Trademark Office in U.S. Appl. No. 14/048,829, dated Jun. 29, 2016.
Office action in Inter Partes Reexamination (dated Jul. 15, 2004), U.S. Appl. No. 95/000,040, filed Apr. 21, 2004, 10pp.
Order Granting/Denying Request for Inter Partes Reexamination (Jul. 15, 2004), U.S. Appl. No. 95/000,040, filed Apr. 21, 2004, 4pp.
Petrie, Edward, "Handbook of Adhesives and Sealants," McGraw-Hill Companies, pp. 105-106, 2000.
Proposed R&A/USGA COR Solution, http://www.randa.org/rules/equipment/noticeDetails/1, author unknown, May 2002.
Properties and Performance of Polymer-Matrix Composites (ASM Metals Handbook Online, ASM International, 2003), Thermoset-Matrix, Composites.
Response to Office action dated Jul. 15, 2004 (dated Sep. 15, 2004), U.S. Appl. No. 95/000,040, filed Apr. 21, 2004, 10pp.
Resubmission of Response to Office action dated Jul. 15, 2004 in Response to Nov. 24, 2004 Inter Parties Reexamination Communication (Dec. 7, 2004), U.S. Appl. No. 95/000,040, filed Apr. 21, 2004, 11pp.
Response to Office action dated Sep. 21, 2004 (dated Nov. 21, 2005), U.S. Appl. No. 95/000,040, filed Apr. 21, 2004, 10pp.
Response to Office action dated Jun. 3, 2005 (dated Aug. 3, 2005), U.S. Appl. No. 95/000,085, filed Mar. 29, 2005, 6pp.
Resubmission of Response to Office action dated Jun. 3, 2005 in Response to Sep. 30, 2005 Inter Parties Reexamination Communication (Oct. 28, 2005), U.S. Appl. No. 95/000,085, filed Mar. 29, 2005, 9pp.
Submission of Prior Art Under 37 CFR 1.902 and Request for Inter Partes Reexamination (Apr. 21, 2004), U.S. Pat. No. 6,623,378, issued Sep. 23, 2003 (cited in U.S. Appl. No. 95/000,040), 16pp.
Third Party Requester Comments to Office action and Patent Owner's Response Thereto (dated Dec. 16, 2005), U.S. Appl. No. 95/000,040, filed Apr. 21, 2004, 11pp.
Third Party Requester Comments to Office action and Applicant's Response Thereto (dated Oct. 14, 2004), U.S. Appl. No. 95/000,040, filed Apr. 21, 2004, 30pp.
Third Party Requester Comments to Office action and Patent Owner's Response Thereto (dated Sep. 1, 2005), U.S. Appl. No. 95/000,085, filed Mar. 29, 2005, 12pp.
Third Party Requester Comments to Office action and Patent Owner's Resubmitted Response Thereto (dated Nov. 15, 2005), U.S. Appl. No. 95/000,085, filed Mar. 29, 2005, 3pp.
Transmittal of Communication to Third Party Requester Inter Partes Reexamination, Office action in Inter Partes Reexamination (dated Sep. 21, 2005), U.S. Appl. No. 95/000,040, filed Apr. 21, 2004, 10pp.
Transmittal of Communication to Third Party Requester Inter Partes Reexamination, Action Closing Prosecution (Jan. 24, 2007), U.S. Appl. No. 95/000,040, filed Apr. 21, 2004, 12pp.
Transmittal of Communication to Third Party Requester Inter Partes Reexamination, Right of Appeal Notice (Sep. 20, 2007), U.S. Appl. No. 95/000,040, filed Apr. 21, 2004, 26pp.
Transmittal of Communication to Third Party Requester Inter Partes Reexamination, Notice of Intent to Issue Inter Partes Reexamination Certificate (Nov. 26, 2007), U.S. Appl. No. 95/000,040, filed Apr. 21, 2004, 4pp.
Transmittal of Communication to Third Party Requester Inter Partes Reexamination, Office action in Inter Partes Reexamination (Jun. 3, 2005), U.S. Appl. No. 95/000,085, filed Mar. 29, 2005, 13pp.
Transmittal of Communication to Third Party Requester Inter Partes Reexamination, Order Granting/Denying Request for Inter Partes Reexamination (Jun. 3, 2005), U.S. Appl. No. 95/000,085, filed Mar. 29, 2005, 10pp.

(56) References Cited

OTHER PUBLICATIONS

Transmittal of Communication to Third Party Requester Inter Partes Reexamination, Notice re Defective Paper in Inter Partes Reexamination (Sep. 30, 2005), U.S. Appl. No. 95/000,085, filed Mar. 29, 2005, 5pp.

Transmittal of Communication to Third Party Requester Inter Partes Reexamination, Action Closing Prosecution (Jan. 25, 2007), U.S. Appl. No. 95/000,085, filed Mar. 29, 2005, 16pp.

Transmittal of Communication to Third Party Requester Inter Partes Reexamination, Right of Appeal Notice (Aug. 17, 2007), U.S. Appl. No. 95/000,085, filed Mar. 29, 2005, 28pp.

Decision Denying Institution of Inter Partes Review, dated Jul. 18, 2018, Case No. IPR2018-00518 for U.S. Pat. No. 7,261,646, for a Golf Club Head, owned by Taylor Made Golf Company, Inc., 22 pages.

Decision Denying Institution of Inter Partes Review, dated Jul. 18, 2018, Case No. IPR2018-00537 for U.S. Pat. No. 7,494,425, for a Golf Club Head, owned by Taylor Made Golf Company, Inc., 23 pages.

Hull et al., "An Introduction to Composite Materials," 2nd edition (1996).

Petition for Inter Partes Review, filed Jan. 17, 2018, Case No. IPR2018-00516 for U.S. Pat. No. 8,932,150, for a Golf Club Head, owned by Taylor Made Golf Company, Inc.

Petition for Inter Partes Review, filed Jan. 19, 2018, Case No. IPR2018-00518 for U.S. Pat. No. 7,261,646, for a Golf Club Head, owned by Taylor Made Golf Company, Inc.

Petition for Inter Partes Review, filed Jan. 26, 2018, Case No. IPR2018-00537 for U.S. Pat. No. 7,494,425, for a Golf Club Head, owned by Taylor Made Golf Company, Inc.

Petition for Inter Partes Review, filed Jan. 26, 2018, Case No. IPR2018-00540 for U.S. Pat. No. 8,353,785, for a Golf Club Head, owned by Taylor Made Golf Company, Inc.

Petition for Inter Partes Review, filed Feb. 15, 2018, Case No. IPR2018-00657 for U.S. Pat. No. 8,096,896, for a Golf Club Head Having a Composite Crown, owned by Taylor Made Golf Company, Inc.

Procedure for Measuring the Velocity Ratio of a Club Head for Conformance to Rule 4-1 e, Appendix II, Revision 2 (Feb. 8, 1999).

\* cited by examiner

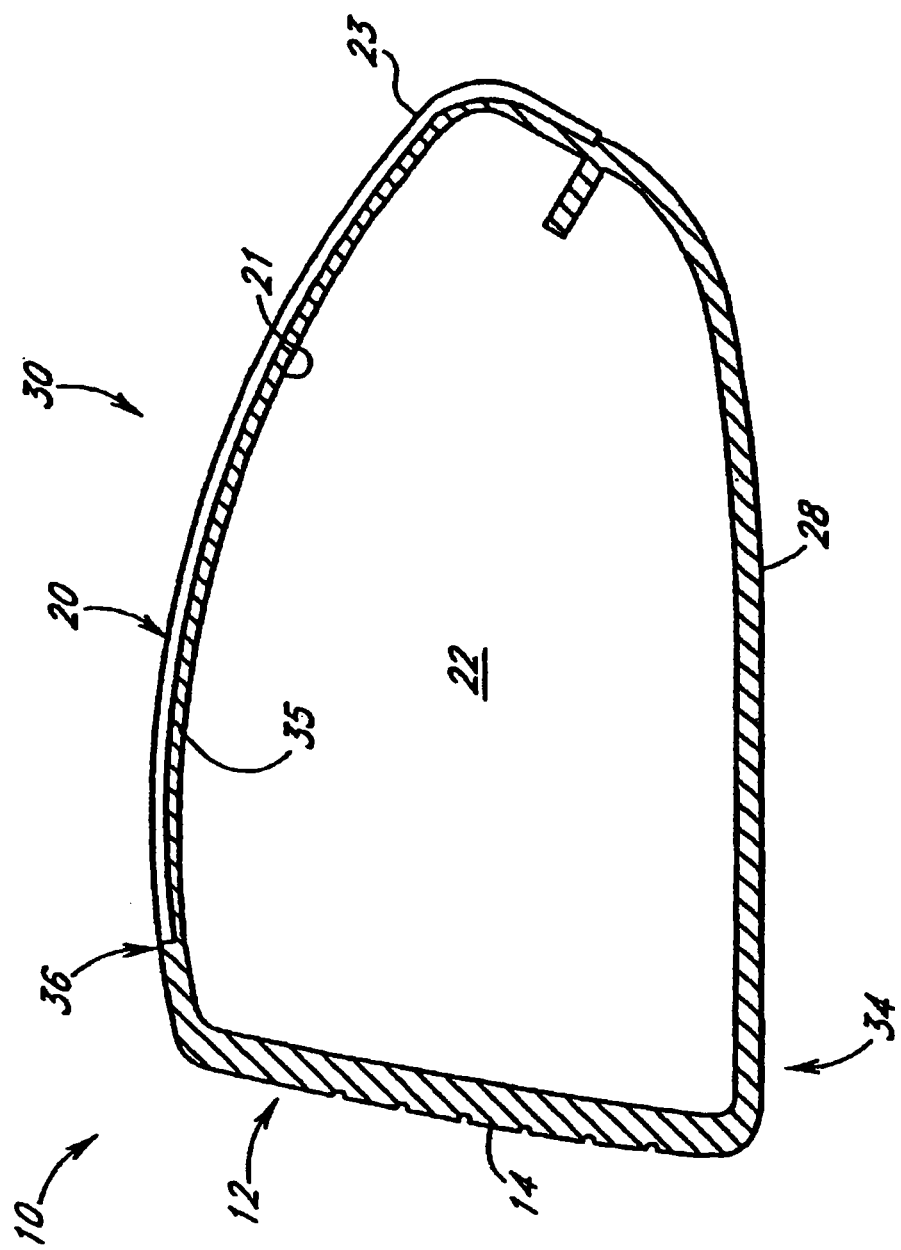

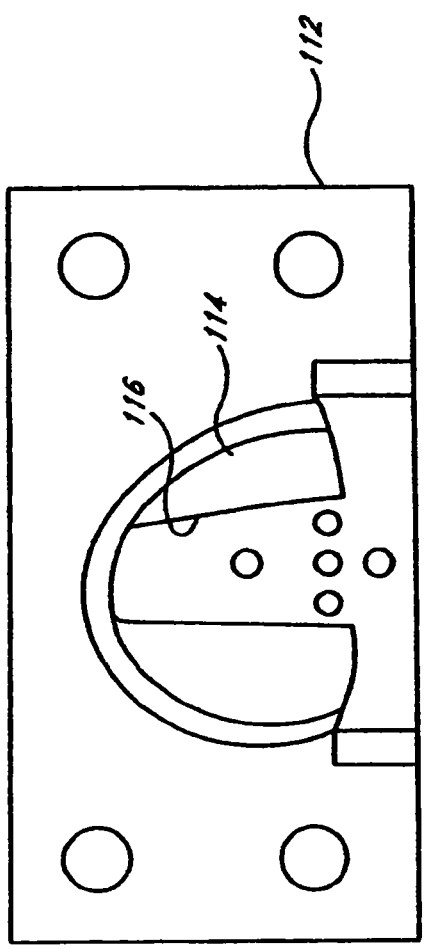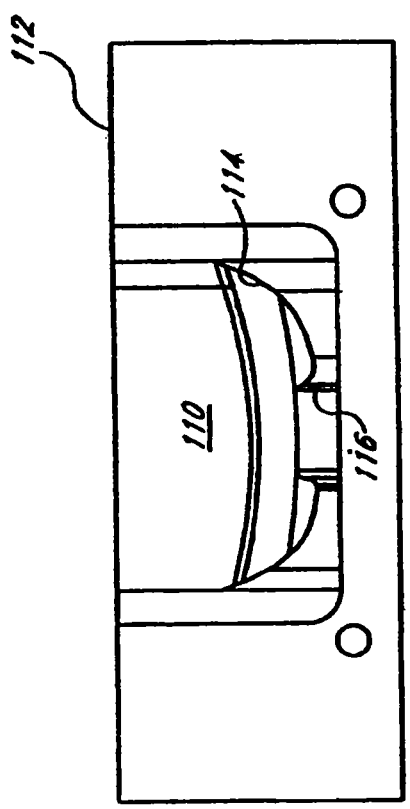
FIG.11A
FIG.11B

GOLF CLUB HEAD

CROSS-REFERENCE TO RELATED APPLICATIONS

This application is a continuation of U.S. patent application Ser. No. 15/404,512, filed Jan. 12, 2017, which is a continuation of U.S. patent application Ser. No. 14/048,829, filed Oct. 8, 2013, now U.S. Pat. No. 9,579,549, issued Feb. 28, 2017, which is a continuation of U.S. patent application Ser. No. 12/730,125, filed Mar. 23, 2010, now U.S. Pat. No. 8,579,726, issued Nov. 12, 2013, which is a continuation of U.S. patent application Ser. No. 12/253,005, filed Oct. 16, 2008, now U.S. Pat. No. 7,704,164, issued Mar. 27, 2010, which is a continuation of U.S. patent application Ser. No. 11/401,472, filed Apr. 10, 2006, which is a continuation of U.S. patent application Ser. No. 10/941,474, filed Sep. 15, 2004, now U.S. Pat. No. 7,041,005, issued May 9, 2006, which is a continuation of U.S. patent application Ser. No. 10/621,641, filed Jul. 17, 2003, now U.S. Pat. No. 6,872,152, issued Mar. 29, 2005, which is a continuation of U.S. patent application Ser. No. 09/878,634, filed Jun. 11, 2001, now U.S. Pat. No. 6,623,378, issued Sep. 23, 2003, all of which are hereby incorporated by referenced herein in their entireties.

BACKGROUND OF THE INVENTION

Field of the Invention

The present invention relates to an improved method for producing a golf club head, and more particularly to an improved method of producing a club head made of a carbon fiber composite.

Description of the Related Art

A wood-type golf club typically includes a hollow shaft with a club head attached to the lower end of the shaft. The club head typically includes a load-bearing outer shell with an integral or attached strike plate. The strike plate defines a substantially planar front surface or strike face for striking a golf ball.

A recent trend in the industry is to make the club head out of strong, yet lightweight material, such as, for example, titanium, a titanium alloy or a carbon fiber composite. Of these materials, carbon fiber composites are particularly interesting to golf club designers because it has a density that is roughly one third of the density of titanium but is almost as strong as titanium. Accordingly, carbon fiber composites are particularly suitable for very large club heads (i.e., club heads that define an internal volume greater than 400 centimeters cubed).

Despite their low density and strength, club heads that are made entirely of carbon fiber composites are generally not popular. This is due, in part, to the relatively high stiffness that is typical of carbon fiber composites. Such stiffness usually is undesirable especially in the strike plate. Moreover, carbon fiber composites are not particularly durable. Thus, composite club heads have a tendency to wear out in the areas that are subjected large amounts of wear and friction (e.g., the sole of the club head).

To overcome some of these problems, it has been suggested that the club head be made from a combination of titanium or alloy and carbon fiber composites. Specifically, it has been suggested that a club head can be formed from an outer shell made of a carbon fiber composite, which is attached to a strike plate made of a titanium or a titanium alloy. However, existing methods for manufacturing such a club have not been satisfactory. For example, one golf club manufacturer attempted to co-cure a metal strike plate with a composite outer shell. More specifically, a metal strike plate was placed in a mold along with an inflatable bladder that was surrounded by a uncured composite material. To cure the composite, the bladder was inflated to press the uncured material against the mold and the strike plate. However, fitting the strike face into mold and removing the bladder from the cured club head was difficult and time consuming.

SUMMARY OF THE INVENTION

An aspect of the present invention is an improved method for producing a club head comprising of a metal strike plate and a composite shell. A further aspect of the present invention is the realization that such a club can be produced by attaching the metal strike plate to the composite shell after the composite shell is formed. However, for the metal strike plate to be successfully attached to the strike plate the composite shell must be produced in a manner that ensures tight tolerances and smooth surfaces on both the inside surfaces and outside surfaces of the shell.

Accordingly, one aspect of the invention is a method for forming a golf club head. The method comprises placing an uncured composite material between a core and a mold that comprises a first piece and a second piece. The second piece is moved towards the first piece such that the uncured composite material is compressed between the core and at least a portion of the mold. The uncured composite material is heated. A first portion of the golf club head is removed from the mold. A second portion of the golf club head is provided. The first portion is attached to the second portion.

Another aspect of the invention is a method for forming a golf club head. The method comprises placing an uncured composite material between a core and a mold that comprises a first piece and a second piece. The second piece is moved towards the first piece such that the uncured composite material is compressed between the core and at least a portion of the mold. The uncured composite material is heated. A first mating section is formed on the first portion. A first portion of the golf club head is removed from the mold. A second portion of the golf club head is provided. The first portion is attached to the second portion.

Yet another aspect of the invention is a golf club head comprising a shell made of a composite material that is attached to a strike plate that is formed of a metallic material. The shell includes a first mating section and the strike plate including a second mating section configured to mate with the first mating section.

Still yet another aspect of the present invention is a golf club head comprising a shell made of a composite material that is attached to a strike/sole plate combination. The strike/sole plate combination includes strike plate and sole plate, which are integrally formed and made of a metallic material. The shell includes a first mating section and the strike/sole plate combination includes a second mating section configured to mate with the first mating section.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

These and other features of the invention will now be described with reference to the drawings of a preferred embodiment, which are intended to illustrate and not to limit the invention, and in which:

FIG. 3C is a cross-sectional view of a modified arrangement of a golf club head;

FIG. 11A is a top view of a first mold piece of the mold of FIG. 8;
FIG. 11B is a front view of the first mold piece.

DETAILED DESCRIPTION OF THE PREFERRED EMBODIMENT

FIGS. 1-5 illustrated a club head 10 having certain features and advantages according to the present invention. With initial reference to FIG. 1, the club head 10 comprises a strike plate 12. The strike plate 12 defines a substantially planar front surface or strike face 14 for impacting a golf ball. A hosel 16 extends upward from the strike plate 12. The hosel 16 is configured to be coupled to a golf club shaft (not shown) in a well known manner. The strike plate 12 is preferably made of a strong, yet lightweight metal, such as, for example, titanium or a titanium alloy.

Figure 3B:
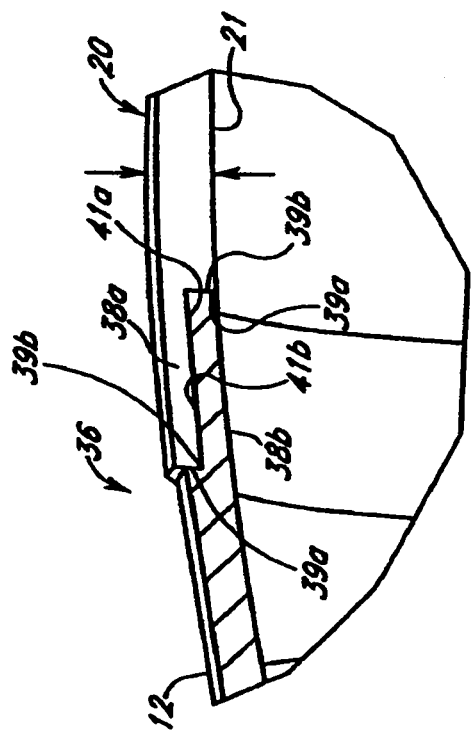
FIG. 3B is an enlarged cross-sectional view of the area with the circle labeled 3B of FIG. 3A.
Figure 3A:
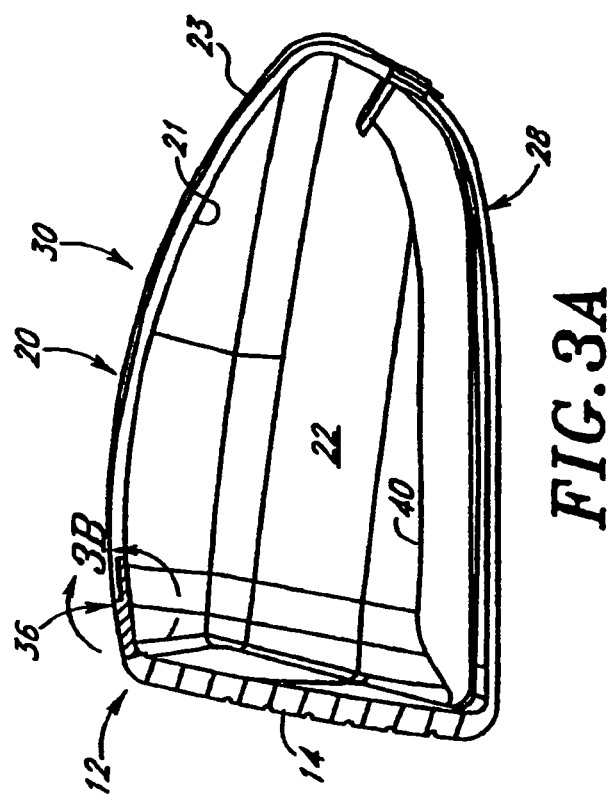
FIG. 3A is a cross-sectional view of the golf club head of FIG. 1.

The club head 10 also comprises an outer shell 20 that is preferably made of a strong yet lightweight composite material, such as, for example, a carbon fiber reinforced epoxy or carbon fiber reinforced polymer. As best seen in FIG. 3A, the outer shell 20 includes an inner surface 21, which defines an interior volume 22 of the club head 10, and an outer surface 23. The club head 10 also includes a toe region 24 and a heel region 26, as is well known. The bottom of the club head 10 is delimited in part by a sole 28 and the top of the club head is delimited by a crown 30.

Figure 1:
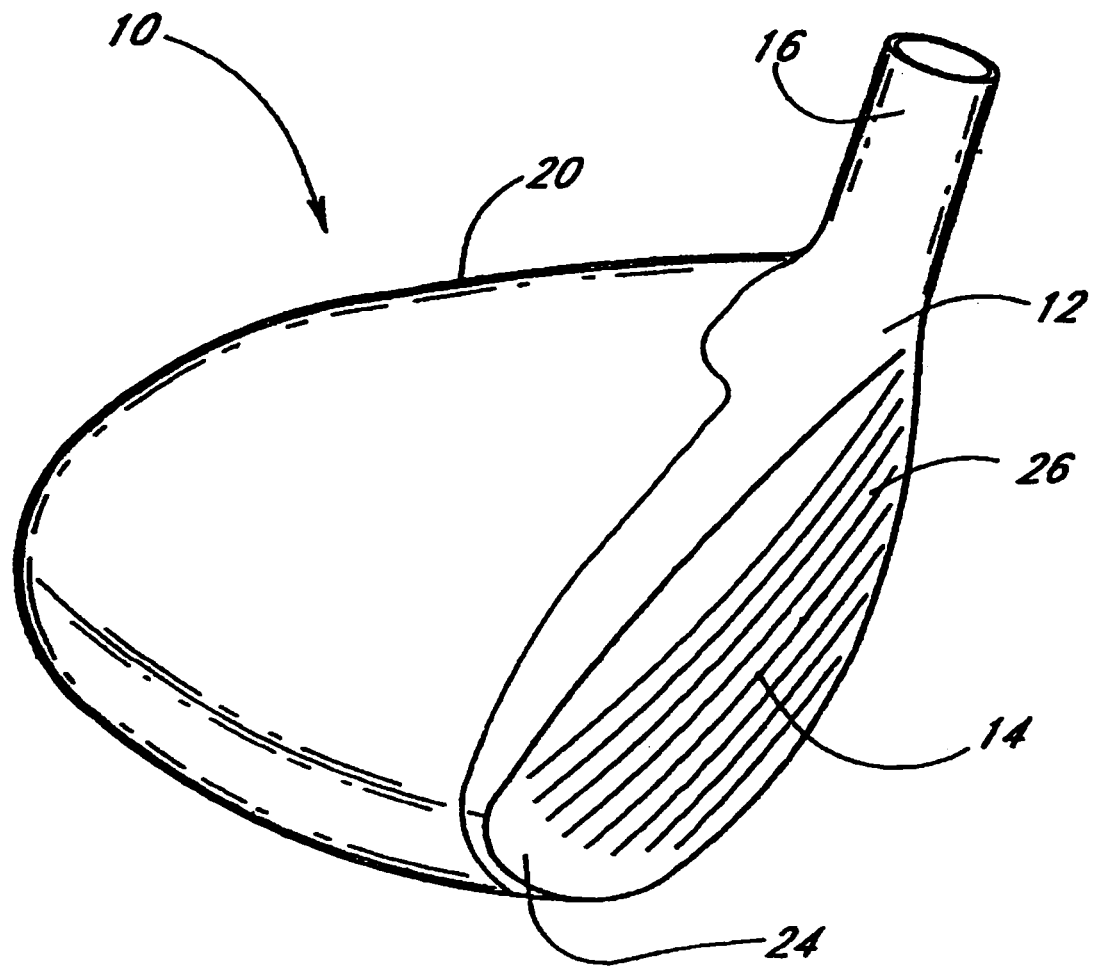
FIG. 1 is a front perspective view of a golf club head having certain features and advantages according to the present invention.
Figure 2:
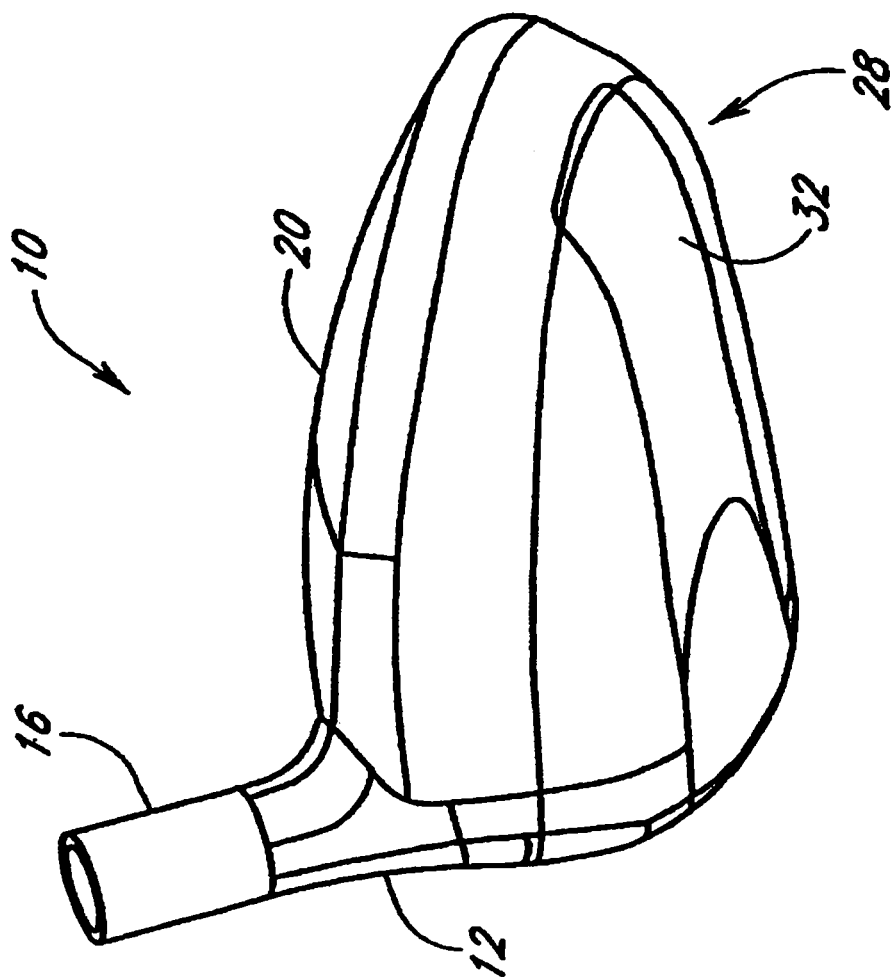
FIG. 2 is a rear perspective of the golf club head of FIG. 1.
Figure 4:
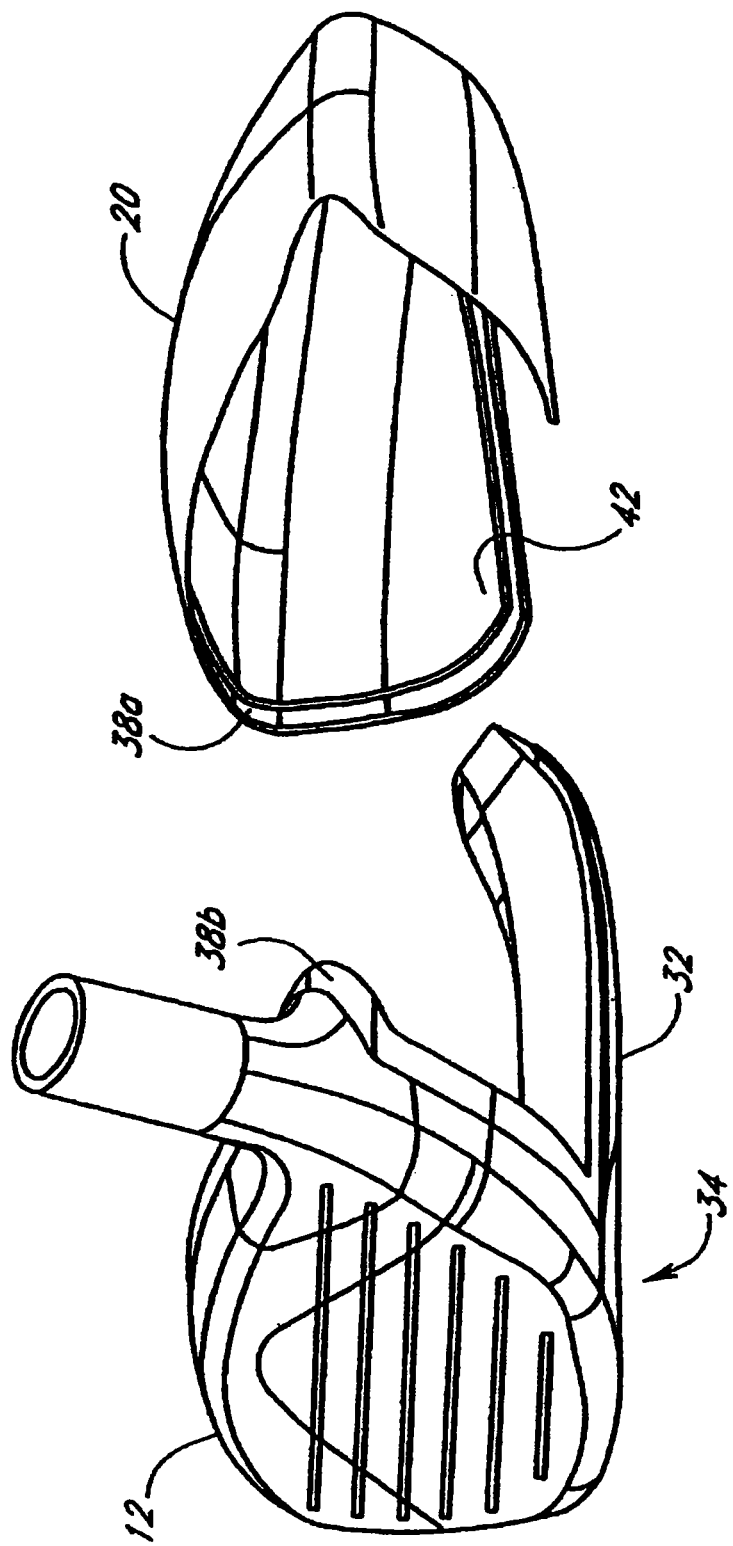
FIG. 4 is a side perspective view of a strike/sole plate combination and outer shell of the club head of FIG. 1.

With particular reference to FIGS. 2 and 4, the illustrated club head 10 also comprises a sole plate 32, which extends along the center of the sole 28 from the strike plate 12 to the rear of the club head 10. As best seen in FIG. 4, in the illustrated arrangement, the sole plate 32 is formed integrally with the strike plate 12. That is, the sole plate 32 and the strike plate 12 form a single strike/sole plate combination 34. The outer shell 20 preferably is attached to this sole/strike plate combination 34, as will be described in more detail below. The sole plate 32 protects the 28 sole of the club head 10 from friction and wear during a golf swing. Accordingly, the sole plate 32 preferably is made of a material that is more durable than the shell 20, such as, for example, a metal. More preferably, the sole plate 32 is made of the same strong, yet lightweight metal as the strike plate 12. It should be appreciated, however, that several features and advantages of the present invention can be achieved in an arrangement wherein the strike plate 12 and the sole plate 32 are not integrally formed (i.e., the strike plate 12 and the sole plate 32 are separate pieces). Moreover, in some arrangements of the present invention, the club head 10 can be formed without the sole plate 32. In other arrangements, the club head 10 can be formed without the strike plate 12. However, the illustrated arrangement is preferred because the mechanical properties of metal are particularly suited for the strike plate 12 and the sole plate 32. As mentioned above, the strike plate 12 and the sole plate 32 are preferably made of a strong, yet light weight metal, such as, for example, titanium. In such an arrangement, the stile plate 12 and/or the sole plate 32 can be formed by casting, forging, rolling or a combination of casting, forging and/or rolling.

FIG. 3C illustrates another arrangement of the club head 10. In this arrangement, the club head 10 includes an inner shell 35 that is preferably integrally formed with the strike/sole plate combination 34. In this arrangement, the inner shell 35 defines the inner surface 21 of the club head 35. The inner shell 35 is preferably made of the same strong, yet lightweight metal as the strike/sole plate combination. The outer surface 23 of the club head 10 is defined by the outer shell 20, which surrounds the inner shell 35 and is preferably made of a strong yet lightweight composite material, such as, for example, a carbon fiber reinforced epoxy or carbon fiber reinforced polymer.

As mentioned above, the outer shell 20 preferably is attached to the strike/sole plate combination 34. To improve the strength of the connection between the outer shell 20 and the strike/sole plate combination 34, the outer shell 20 and the strike/sole plate combination 34 preferably include an interlocking joint 36, which is best seen in FIGS. 3A and 3B. In the illustrated embodiment, the joint 36 comprises mating sections 38a, 38b formed on the outer shell 20 and the strike/sole plate combination 34 respectively. Each mating section 38a, 38b preferably includes an abutment surface 39a, 39b that is transverse to the outer surface 23. More preferably, the abutment surface 39a, 39b, lies substantially normal to the outer surface 23. The abutment 39a, 39b surfaces help to align the shell 20 with the strike/sole plate combination 34 and to prevent lateral movement of these two components 20, 24 with respect to each other. Each mating section 38a, 38b, preferably also includes an attachment surface 41a, 41b. The attachment surfaces 41a, 41b are at least two (2) times, and preferably, four (4) times as wide as the thickness t of the outer shell 20. The attachment surfaces 41a, 41b preferably provide a surface for an adhesive as will be explained in more detail below. The attachment surfaces 41a, 41b preferably are generally parallel to the outer surface 23 of the shell 20 and midway between the inner surface 21 and outer surface 23 of the outer shell 20. This arrangement is preferred because it permits a longer attachment surface and thicker mating sections 38a, 38b, which increases the strength of the joint 36 and the bond between the shell 20 and the strike/sole plate combination 34 respectively. In the arrangement illustrated in FIG. 3C, the attachment surfaces 41a, 41b can extend along the entire length of the outer shell 20.

As best seen in FIG. 4, the mating sections 38a, 38b, preferably extend completely along the interface between the outer shell 20 and the strike/sole plate 34 combination. However, it should be appreciated that, in a modified arrangement, the mating sections 38a, 38b could extend only partially along the interface between the outer shell 20 and the strike/sole plate combination 34. In the illustrated arrangement, each piece 38a, 38b includes two abutment surfaces 39a, 39b, which are separated by the attachment surfaces 41a, 41b. That is, the abutment surfaces 39a, 39b, and the attachment surfaces 41a, 41b, form an interlocking steps. However, it should be appreciated that the mating sections 38a, 38b can be formed into a variety of other shapes giving due consideration to the preference of providing a secure connection between the outer shell 20 and the strike/sole plate combination 34. For example, the mating sections 38a, 38b can comprise an interlocking tongue and groove arrangement or a matching inclined surface arrangement, each of which includes abutment surfaces 39a, 39b and attachment surfaces 41a, 41b.

Figure 5:
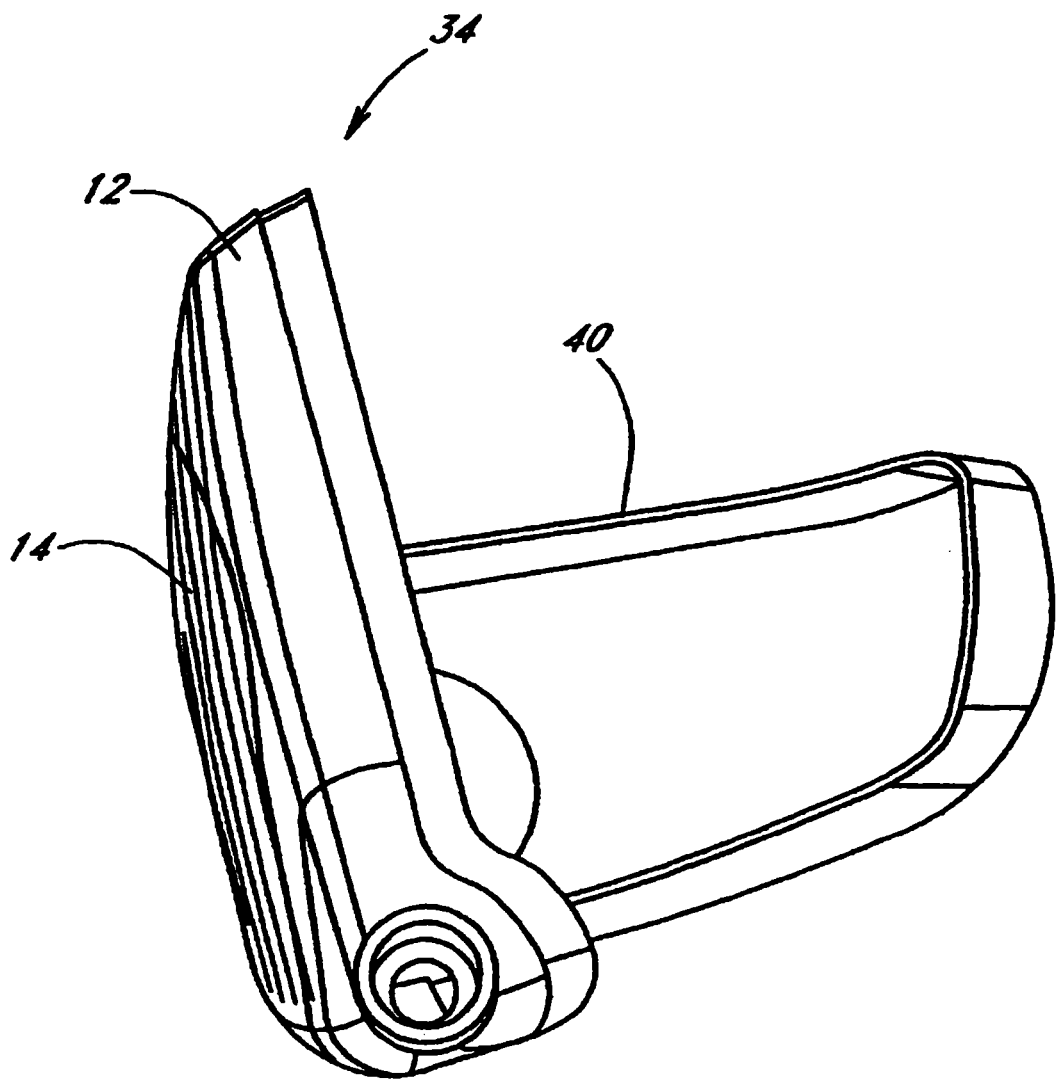
FIG. 5 is a top view of the strike/sole plate combination of FIG. 4.

To permanently secure the outer shell 20 to the strike/sole plate combination 34, an adhesive, such as, for example, an epoxy is applied to one or both of the mating sections 38a, 38b, preferably, along the attachment surfaces 41a, 41b. In a modified arrangement, the outer shell 20 can be secured to the strike/sole plate combination 34 by fasteners that can extend through the joint 36. As best seen in FIGS. 3A and 5, the sole plate 32 preferably includes an annular rib 40, which extends from the periphery of the sole plate 32 and into the cavity 22 of the club head 10. The annular rib 40 advantageously increases the rigidity of the sole plate 32. Of course, those of skill in the art will recognize that the sole plate 32 can be formed without the annular rib 40.

To ensure a secure bond between the outer shell 20 and the strike/sole plate combination 34, the joint 36 (i.e., the interlocking step surfaces 38a, 38b) preferably are made with tight tolerances and smooth surfaces. More preferably, these components are made with a tolerance that is less than approximately ±0.15 millimeters. With respect to the interlocking step surface 38a of the outer shell 20, prior methods for producing carbon fiber club heads are not adequate for creating the desired tight tolerances and smooth surfaces. This is especially true with respect to the inner surface 21 of the outer shell 20 and the portion of which forms the interlocking step surface 38a of the outer shell 20 (see FIG. 3B).

Figure 6:
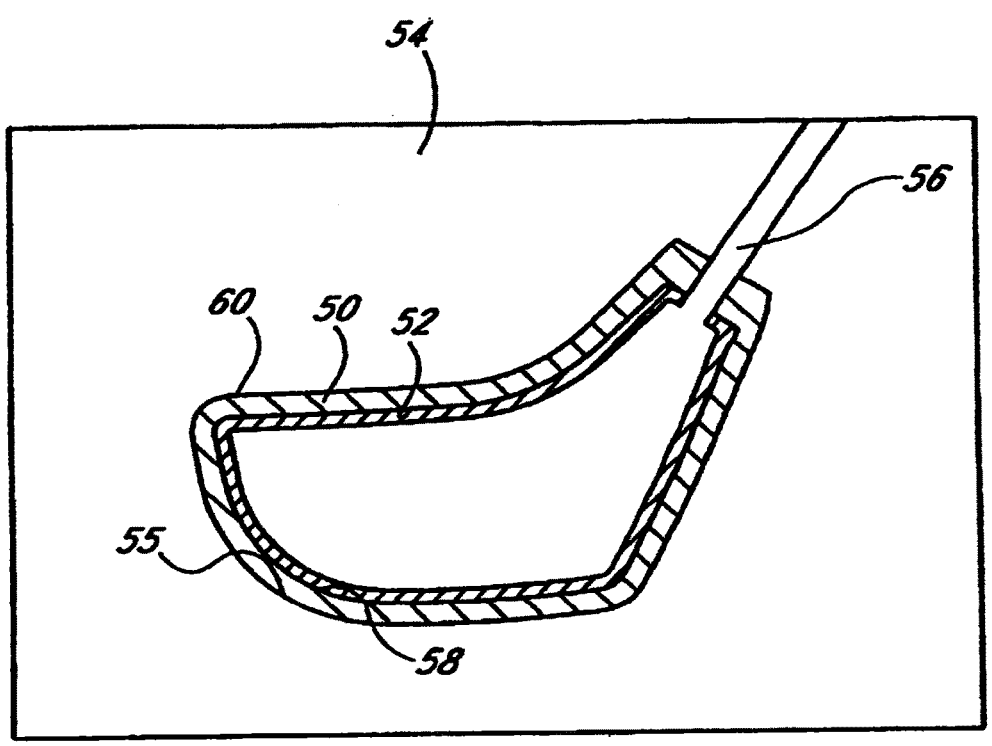
FIG. 6 is a cross-sectional view of a mold according to a method in the prior art.

For example, FIG. 6 shows a cross-section of a carbon fiber club head being produced according to the methods of the prior art. According to this technique, an uncured composite material 50 is wrapped around an inflatable bladder 52. The bladder 52 and the composite material 50 are placed within a mold 54 and heated to a specified temperature to soften the uncured composite. The bladder 52 then is inflated with pressurized air, steam or oil through one or more openings 56. As the bladder 52 expands, the composite material 50 is pressed against the inner surfaces 55 of the mold 54. After the composite material 50 cures, the golf club head is removed from the mold 54 and the bladder 52 is deflated and removed from the golf club through the one or more openings 56.

One problem with the above-described method is that it is difficult to obtain tight tolerances and smooth surfaces on the interior surfaces 58 of the club head. This difficulty is due primarily to the nature of the inflatable bladder 52. As the bladder 52 expands, the composite material 50 is pressed against the hard smooth inner surface 55 of the mold 54. This tends to produce a smooth surface on the outer surfaces 60 of the composite material. In contrast, the relatively flexible surface of the inflatable bladder 52 presses against the interior surfaces 58 of the composite material. This tends to produce an uneven surface, which makes it difficult to obtain the tight tolerances and smooth surfaces.

Figure 7:
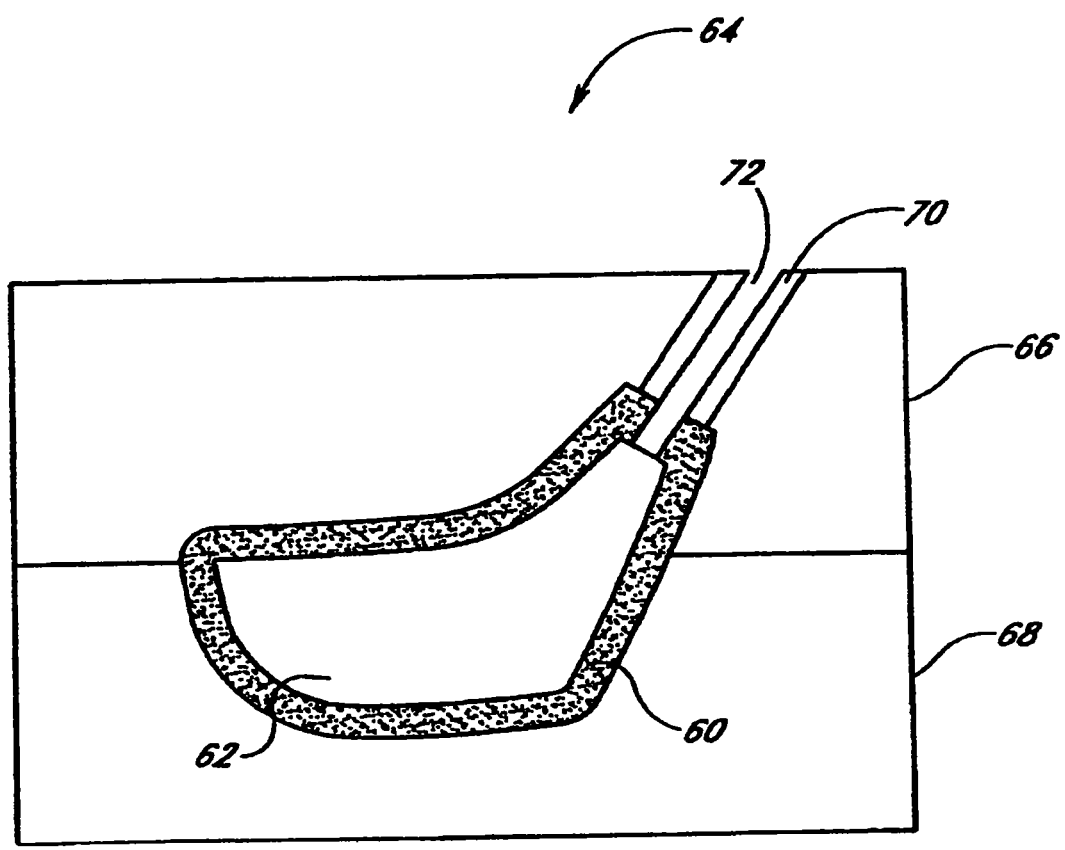
FIG. 7 is cross-sectional view of a mold according to another method in the prior art.

A technique that is likely to be more successful in obtaining tight tolerance on the interior surfaces of the club head is shown in FIG. 7. This method uses, sheets 60 of fibrous material that are wrapped around a core 62 made of a low melting point alloy. The core 62 and the fibrous material 60 are placed within a cavity of a splittable mold 64 made of a pair of mold halves 66, 68. The fibrous material 60 lies within a peripheral gap is formed between the core 62 and the mold 68. Once the core 62 and fibrous material 60 are in place, resin is injected into the peripheral gap through an opening 70. The resin flows through the fibrous material and hardens to form the golf club head. The mold 68 is heated to melt the core 62, which can be removed from a hole 72 formed in the club head.

This method, however, has a number of significant drawbacks. For example, because the resin must flow through the fibrous material, the fiber loading of the fibrous material must be kept to a relatively small amount. This reduces the strength of the final composite material. The method also requires the two halves 66, 68 of the mold 64 to be sealed so as to prevent the resin from leaking out of the mold 64. This increases the cost of manufacturing.

Figure 8:
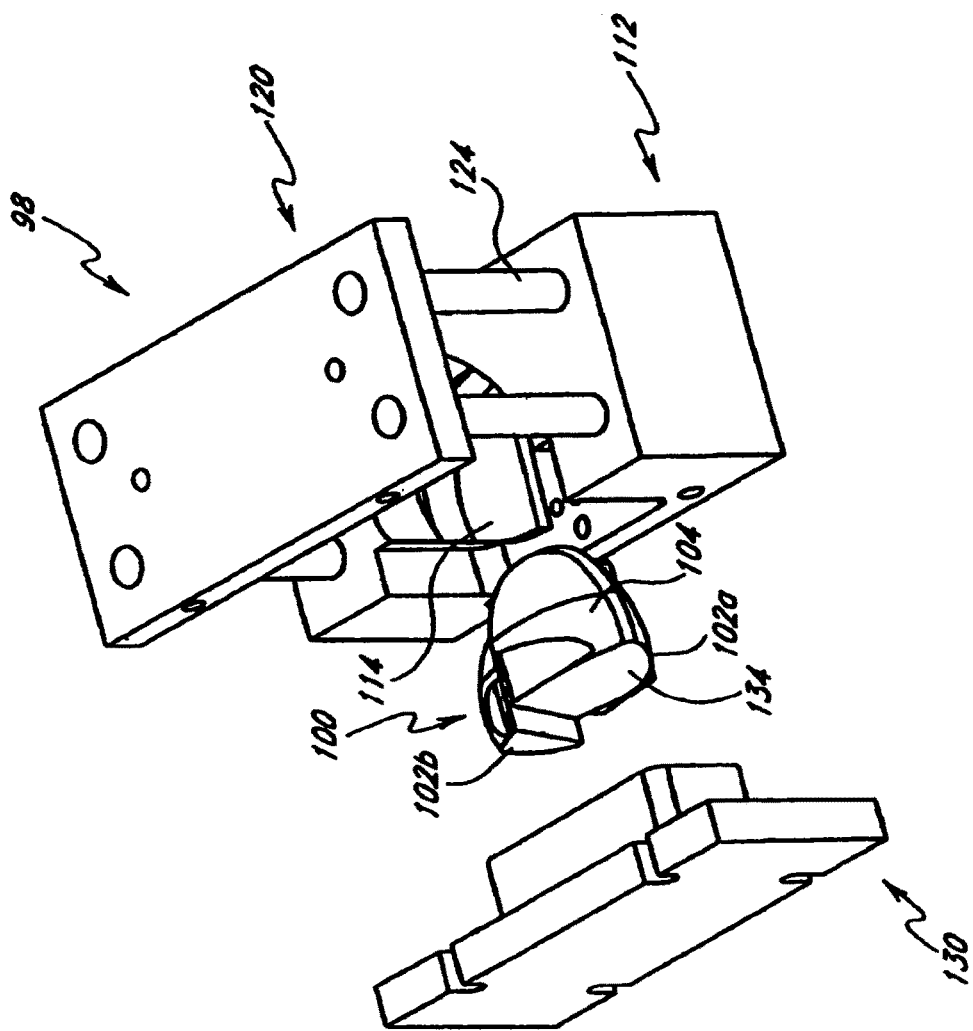
FIG. 8 is a perspective view of a mold for a golf club head having certain features and advantages according to the present invention.
Figure 9B:
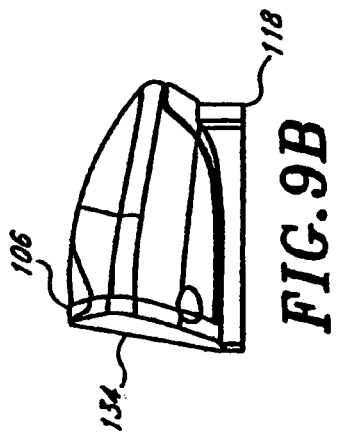
FIG. 9B is a right side view of the core.
Figure 9D:
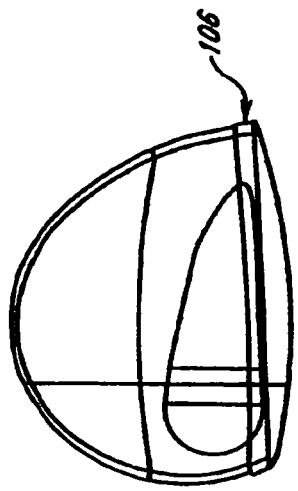
FIG. 9D is a top view of the core.
Figure 9A:
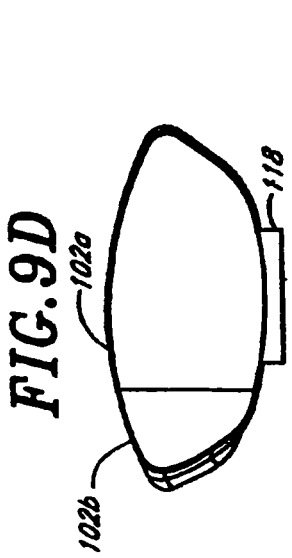
FIG. 9A is a front view of a core of the mold of FIG. 8.
Figure 9E:
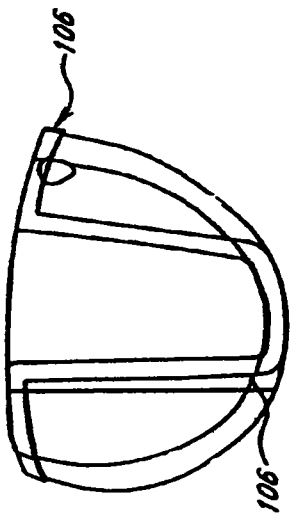
FIG. 9E is a bottom view of the core.
Figure 9C:
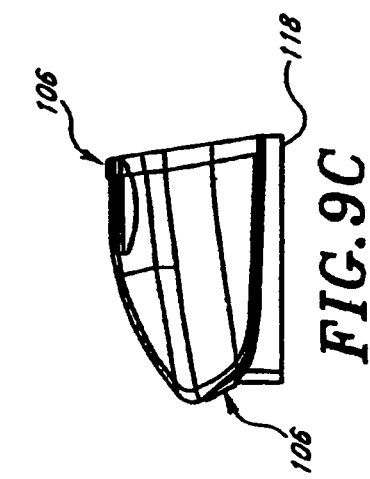
FIG. 9C is a left side view of the core.

To address the above-noted problems, Applicant has invented a method for manufacturing a golf club having certain features and advantages. The method utilizes a mold 98, which is shown in FIG. 8. The mold includes a core or mandrel 100, which is shown in detail in FIG. 9A-E. The core preferably is made of a hard material, such as, for example, aluminum or steel. Preferably, the core 100 comprises a first piece 102a and a second piece 102b. However, it should be appreciated that the core 100 can comprise a single piece or more than two pieces. The two piece construction is preferred for reasons that will be set forth below. The core 100 defines an exterior surface 104, which corresponds generally to the desired shape of the interior surface 21 of the outer shell 20. In particular, the exterior surface 104 includes a ridge 106 that forms an analog to the interlocking step surface 38a of the club head 10 (see FIG. 4). Of course, if the joint 36 has a different configuration the exterior surface 104 can be modified accordingly.

The mold 98 also comprises a first mold piece 112, which is shown in FIGS. 8 and 10-11B. The first mold piece 112 includes an inner surface 114, which generally corresponds to the desired shape of a portion of the outer shell's 20 exterior surface 23. More specifically, in the illustrated arrangement, the inner surface 114 of the mold corresponds to a lower portion (i.e., the portion of outer shell 20 that lies generally below the crown 30) of shell's 20 exterior surface 23. The illustrated first mold piece 112 also includes a spacing groove 116. The groove 116 is configured to receive a tongue piece 118 that is formed on the core 100 (see FIGS. 9A, 9B, and 10). The tongue 118 and groove 116 cooperate to properly align the core 100 within the cavity 110. While the tongue 118 and groove 116 are preferred for the simplicity and reliability, those skilled in the art will recognize that there are other ways to ensure the proper alignment of the core 100 within the cavity 110.

The mold 98 further includes a second mold piece 120, which is shown in FIGS. 8, 10, 13 and 14. The second mold piece 120 has a second inner surface 122, which preferably is configured to generally correspond to the desired shape of the crown 30. The top portion 120 is further configured such that it can be moved towards or away from the first mold piece 112. Accordingly, as shown in FIG. 8, the top portion 112 is connected to the bottom portion 110 by a plurality of shafts 124, which are threaded. The shafts 124 preferably extend through threaded holes formed in the second mold piece 122 and threaded holes formed in the first mold piece 112. Thus, the second mold piece 120 can be moved towards the first mold piece 112 by rotating the shafts 120. Of course, those skilled in the art will recognize that there are other ways for moving the first and second mold pieces 112, 122 towards each other.

Figure 10:
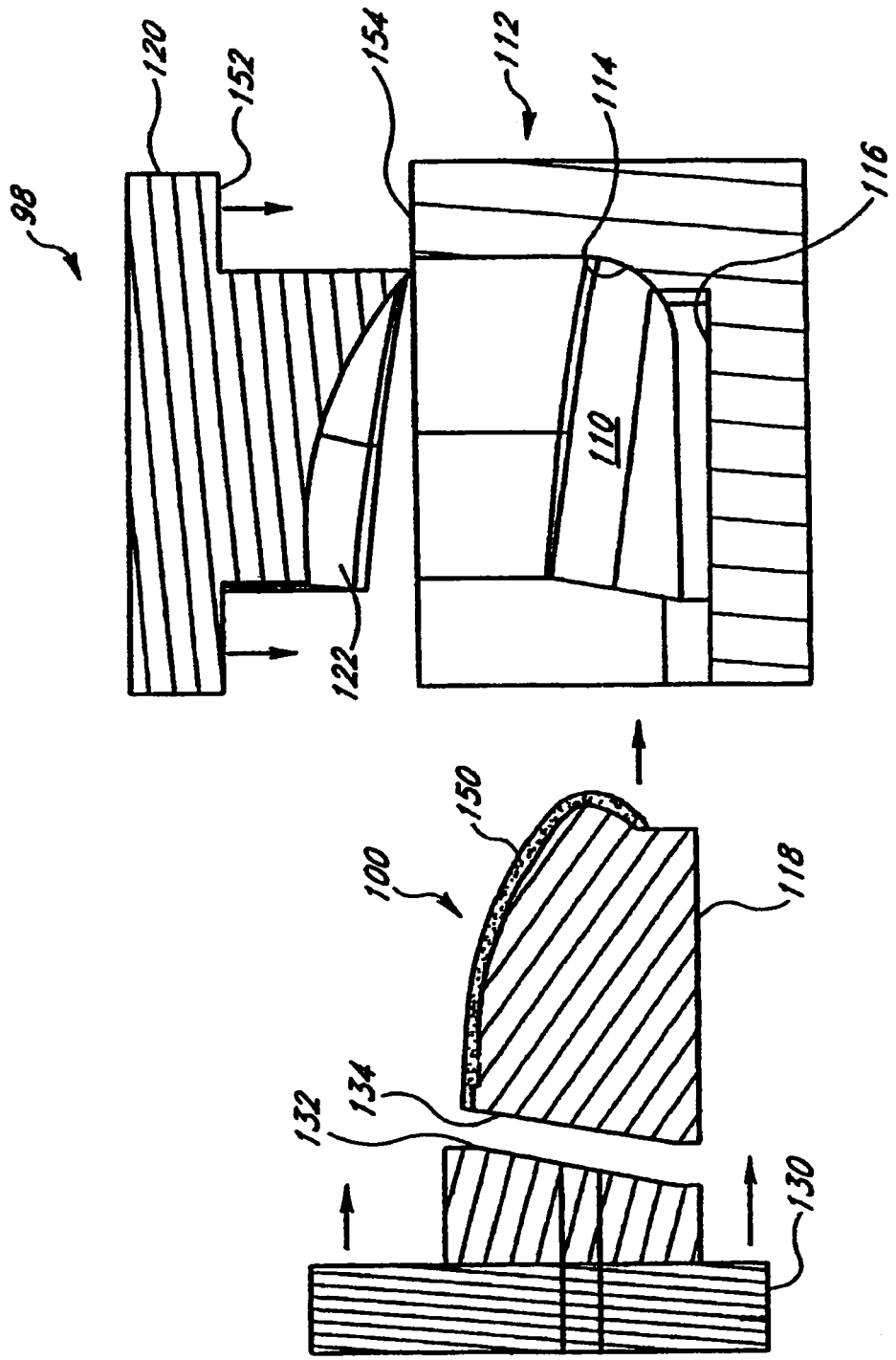
FIG. 10 is a cross-sectional view of the mold of FIG. 8.
Figure 12A:
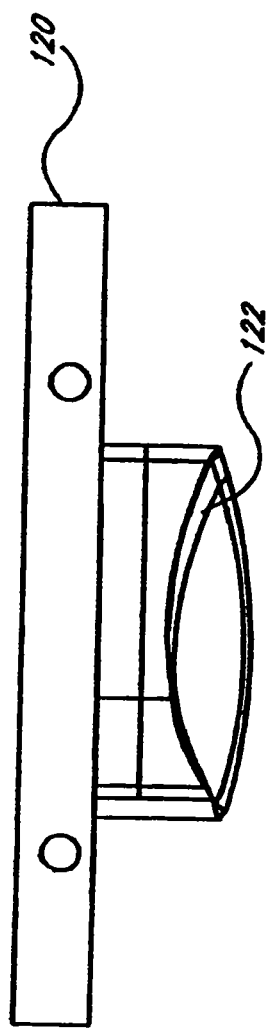
FIG. 12A is front view of a second mold piece of the mold of FIG. 8.
Figure 12B:
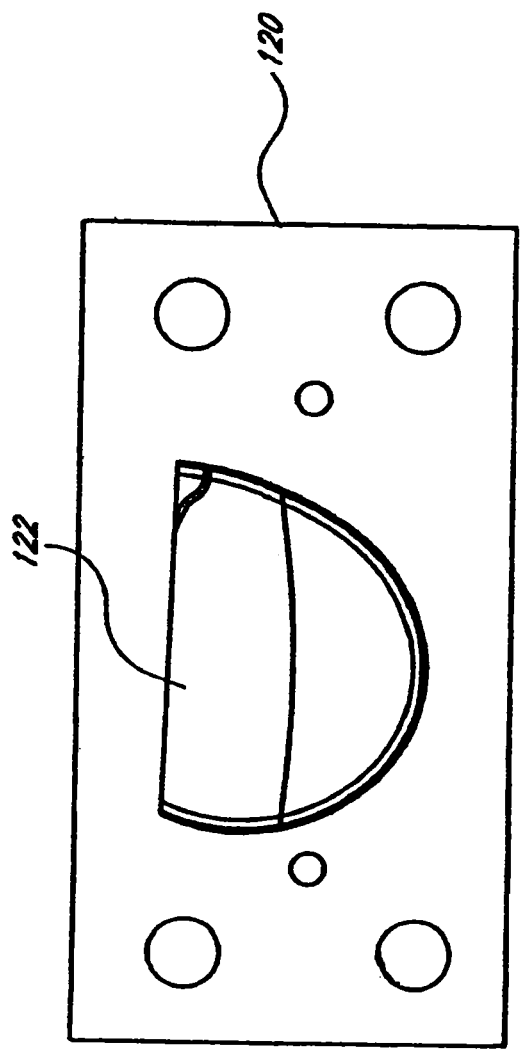
FIG. 12B is a bottom view of the second mold piece.

As shown in FIGS. 8 and 10, the mold 98 preferably also includes a third mold piece 130. The third mold piece 130 includes a third inner surface 132, which is configured to contact a portion 134 of the exterior surface 104 of the core 100.

To form the outer shell 20 of the club head 10, an uncured composite material 150 is placed (i.e., laying up) around the core 100 (see FIG. 10). The uncured composite material 150 preferably is a carbon fiber reinforced thermoset resin or a carbon fiber reinforced plastic resin. The composite material 150 and the core 100 preferably are then placed within the first mold piece 112. Once the core 100 is in place, the third mold piece 130 is attached, preferably with bolts (not shown), to the first mold piece 112. In this position, the third mold piece 130 securely holds the core 100 and composite material 150 within the first mold piece 112.

The second mold piece 130 then is moved towards the first mold piece 112. Accordingly, the uncured composite material 150 is compressed between the first, second mold pieces 112, 120 and the core 100. As the second mold piece 120 is moved towards the first mold piece 112, the lower surface 152 (see FIG. 10) of the second mold piece 120 eventually contacts the upper surface 154 of the first mold piece 112, resulting in a positive stop. Preferably, the first and second mold pieces 112, 120 are configured such that when the lower and uppers surfaces 152, 154 contact a uniform gap exists between the second piece 120 and the core 100. In this manner, the composite material 150 is uniformly compressed between the first and second mold pieces 112, 120 and the core 100.

Preferably, while the composite material 150 is being compressed, the mold 98 is being heated in an oven to a temperature between 200-500 degrees Fahrenheit. More preferably, the mold 98 is heated to a temperature of approximately 350 degree Fahrenheit for approximately 10 minutes. The compressing and heating cures the composite material 150 into the desired shape, which is determined by the shape of the core 100 and the inner surfaces 114, 122 of the first and second mold pieces 112, 120.

After the composite material 150 is cured, the second and third mold pieces are removed. The core 100 can then be removed form the cured shell 20. The illustrated two piece construction of the core 100 aides the removal of the core 100. The finished shell 200 is removed from the mold 98 and attached to a corresponding strike/sole plate 34 combination with epoxy as described above.

In the illustrated arrangement, the strike/sole plate combination 34 is made of titanium or a titanium alloy. This arrangement is preferred because the material properties of titanium are particularly suited for the strike plate 12 and the sole plate 32. However, it should be appreciated that, in a modified arrangement, the above-described method can also be utilized for a club head wherein the strike plate 12 and/or the sole plate 32 are made of a composite material. In such an arrangement, a second mold (not shown) can be formed utilizing the principles described above. The second mold can be used to create a strike plate, a sole plate, or a strike/sole plate combination made of a composite material.

In another modified arrangement, the core 100 is attached to or integrally formed with the first mold piece 112. In such an arrangement, the uncured composite material 150 is placed over the core 100. The second mold piece 130 then is moved towards the first mold piece 112. After the composite material cures, the composite material 150 can be removed from the first mold piece 112.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combination or subcombinations of the specific features and aspects of the embodiments may be made and still fall within the scope of the invention. Accordingly, it should be understood that various features and aspects of the disclosed embodiments can be combine with or substituted for one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:
1. A golf club head, comprising:
a metal body including a crown portion, a sole portion, and a heel portion connecting the crown portion and the sole portion, wherein a hosel formed of a metallic material extends outward from the crown portion proximate the heel portion;
a metal strike plate connected to the metal body and defining a front surface for striking a golf ball, wherein the sole portion, the crown portion, and the heel portion extend rearward from the metal strike plate toward a rear portion of the club head, and the sole portion extends further rearward than the crown portion of the metal body;
wherein the crown portion of the metal body has an outwardly facing attachment surface and a first abut- ment surface extending between the attachment surface and an outer surface of the crown portion; and a composite shell coupled to the crown portion, the composite shell having an outer surface, an inner facing surface, and a second abutment surface extending between the outer surface and the inner facing surface of the composite shell, wherein the inner facing surface of the composite shell is smooth;

wherein the attachment surface of the crown portion is adhesively bonded to the inner facing surface of the composite shell, the first abutment surface is connected to the second abutment surface, and the attachment surface is at least four times as wide as a thickness of the composite shell; and wherein the metal strike plate is formed by casting, forging, rolling or combinations thereof.

2. The golf club head of claim 1, wherein the sole portion extends along a center of the sole.

3. The golf club head of claim 2, wherein the sole portion of the metal body is integrally formed with the metal strike plate.

4. The golf club head of claim 2, wherein the sole portion of the metal body comprises a rib that protrudes inwardly from a periphery of the sole portion into an interior of the golf club head.

5. The golf club head of claim 1, wherein the sole portion of the metal body is formed by casting, forging, rolling or combinations thereof.

6. The golf club head of claim 1, wherein the metal body comprises titanium.

7. The golf club head of claim 1, wherein an interface between the composite shell and the metal body extends along an entire periphery of the golf club head.

8. The golf club head of claim 1, wherein the sole portion defines at least a portion of a sole of the golf club head and the sole portion extends from the metal strike plate to a rear most portion of the sole.

9. The golf club head of claim 1, wherein the composite shell is made with a tolerance that is less than approximately 0.15 millimeters such that a gap between the first abutment surface and the second abutment surface is less than approximately 0.3 millimeter.

10. The golf club head of claim 1, wherein the golf club head has a volume that is greater than 400 cm$^3$.

11. The golf club head of claim 1, wherein the density of the composite shell is roughly one third the density of the metal body.

12. A golf club head, comprising:
a metal body comprising a sole portion, a first portion of a crown, and a heel portion connecting the first portion of the crown and the sole portion, wherein a hosel formed of a metallic material extends outward from the first portion of the crown proximate the heel portion; and a non-metal shell forming a second portion of the crown having a thickness, the first portion of the crown having a first mating section including a first attachment surface and a first abutment surface, and the second portion of the crown having a second mating section including a second attachment surface and a second abutment surface;

wherein the first abutment surface abuts the second abutment surface, the first attachment surface overlaps the second attachment surface, and the first mating section is permanently affixed to the second mating section using an adhesive;

wherein the first attachment surface faces outward and the second attachment surface faces inward;

wherein the first attachment surface is at least four times as wide as the thickness of the second portion of the crown;

wherein the non-metal shell has an inner surface that is smooth; and wherein the metal strike plate is formed by casting, forging, rolling or combinations thereof.

13. The golf club head of claim 12, wherein the non-metal shell is made with a tolerance that is less than approximately 0.15 millimeters such that a gap between the first abutment surface and the second abutment surface is less than approximately 0.3 millimeter.

14. The golf club head of claim 12, wherein the density of the non-metal shell is roughly one third the density of the metal body.

15. The golf club head of claim 12, wherein the golf club head has a volume that is greater than 400 centimeters cubed.

16. The golf club head of claim 12, wherein the golf club head comprises an interior volume that is substantially hollow with the exception of at least one rib.

17. A golf club head, comprising:
a metal body including a crown portion, a sole portion, and a heel portion connecting the crown portion and the sole portion, wherein a hosel formed of a metallic material extends outward from the crown portion proximate the heel portion;

a metal strike plate connected to the body and defining a front surface for striking a golf ball, wherein the sole portion, the crown portion, and the heel portion extend rearward from the strike plate toward a rear portion of the club head, and the sole portion extends further rearward than the crown portion and the heel portion of the body;

wherein the crown portion of the body has an outwardly facing attachment surface; and a composite shell coupled to the crown portion, the composite shell having an outer surface, an inner facing surface, wherein the inner facing surface of the composite shell is smooth;

wherein the attachment surface of the crown portion is adhesively bonded to the inner facing surface of the composite shell, and the attachment surface is at least four times as wide as a thickness of the composite shell;

wherein the density of the composite shell is roughly one third the density of the metal body;

wherein the sole portion of the body is integrally formed with the metal strike plate; and wherein the sole portion and the metal strike plate are formed by casting, forging, rolling or combinations thereof.

18. The golf club head of claim 17, wherein the sole portion of the metal body comprises a rib that protrudes inwardly from a periphery of the sole portion into an interior of the golf club head.

19. The golf club head of claim 17, wherein the composite shell is comprised of carbon fiber reinforced epoxy.

20. The golf club head of claim 17, wherein the golf club head has a volume that is greater than 400 cm$^3$.

* * * * *